US012772359B2

(12) United States Patent
Schembs et al.

(10) Patent No.: US 12,772,359 B2
(45) Date of Patent: Oct. 20, 2026

(54) AUTOMATIC TOGGLING OF STADIUM UPLIGHT STRUCTURES

(71) Applicant: Musco Corporation, Oskaloosa, IA (US)

(72) Inventors: Andrew J. Schembs, Johnston, IA (US); Alireza Razavi, West Des Moines, IA (US); Jason T. Schutz, Oskaloosa, IA (US)

( * ) Notice: Subject to any disclaimer, the term of this patent is extended or adjusted under 35 U.S.C. 154(b) by 24 days.

(21) Appl. No.: 19/048,411

(22) Filed: Feb. 7, 2025

(65) Prior Publication Data

US 2025/0261293 A1 Aug. 14, 2025

Related U.S. Application Data

(60) Provisional application No. 63/552,020, filed on Feb. 9, 2024.

(51) Int. Cl.
*H05B 47/16* (2020.01)
*G01S 5/18* (2006.01)
(Continued)

(52) U.S. Cl.
CPC .............. *H05B 47/125* (2020.01); *G01S 5/18* (2013.01); *G06T 7/70* (2017.01); *H05B 47/12* (2020.01);
(Continued)

(58) Field of Classification Search
CPC ...... H05B 47/12; H05B 47/16; H05B 47/115; H05B 47/125; H05B 47/155;
(Continued)

(56) References Cited

U.S. PATENT DOCUMENTS 8,952,628 B1 * 2/2015 Gordin ................. H05B 47/115 315/297
9,402,292 B1 7/2016 Gordin et al.
(Continued)

FOREIGN PATENT DOCUMENTS

JP 06084403 A 3/1994
KR 102473608 B1 12/2022

OTHER PUBLICATIONS

International Searching Authority, "International Search Report and Written Opinion", From Application No. PCT/US2025/015050, Mailed Jun. 2, 2025, pp. 12.
(Continued)

*Primary Examiner* — Tung X Le
(74) *Attorney, Agent, or Firm* — Kurt J. Fugman; Zachary S. Pratt

(57) ABSTRACT

This disclosure describes a system including one or more lighting structures, each lighting structure comprising one or more uplights. The system further includes one or more sensors each directed towards a common focal area and a computing device in communication with each of the one or more sensors. The computing device includes one or more processors configured to control the one or more sensors to capture data descriptive of a ball moving above the common focal area. Based on the data, the one or more processors predict a motion characteristic of the ball and compare the motion characteristic to a threshold motion characteristic. In response to the motion characteristic being greater than or equal to the threshold motion characteristic, the one or more processors activate at least one of the one or more uplights.

27 Claims, 4 Drawing Sheets

(51) Int. Cl.
*G06T 7/70* (2017.01)
*H05B 47/12* (2020.01)
*H05B 47/125* (2020.01)
*H05B 47/155* (2020.01)
*H05B 47/165* (2020.01)

(52) U.S. Cl.
CPC .......... *H05B 47/155* (2020.01); *H05B 47/16* (2020.01); *H05B 47/165* (2020.01); *G01S 2205/08* (2020.05); *G06T 2207/30224* (2013.01); *G06T 2207/30241* (2013.01)

(58) Field of Classification Search
CPC ..... H05B 47/165; G01S 5/18; G01S 2205/08; G06T 7/70; G06T 2207/30224; G06T 2207/30241
See application file for complete search history.

(56) References Cited

U.S. PATENT DOCUMENTS

| | | | | |
|---|---|---|---|---|
| 10,267,491 | B1 | 4/2019 | Gordin et al. | |
| 10,337,680 | B1 | 7/2019 | Gordin | |
| 10,356,886 | B1 * | 7/2019 | Cooley | H05B 47/196 |
| 10,582,582 | B2 * | 3/2020 | Broers | H05B 45/10 |
| 11,019,693 | B2 * | 5/2021 | De Vries | H05B 47/13 |
| 2006/0176700 | A1 | 8/2006 | Gordin et al. | |
| 2015/0334807 | A1 * | 11/2015 | Gordin | H05B 47/11<br>315/158 |
| 2017/0100658 | A1 | 4/2017 | Tally | |
| 2023/0040575 | A1 | 2/2023 | Ungstrup et al. | |
| 2024/0058682 | A1 * | 2/2024 | Macaulay | A63B 71/02 |

OTHER PUBLICATIONS

M3 Innovation, "Mako Introduction—Introducing the new revolutionary sports lighting platform, Mako, by M3", Screen captures from: https://www.youtube.com/watch?v=UFmzdkQOhEA, Published Aug. 21, 2020, 4 Screen Captures.

* cited by examiner

AUTOMATIC TOGGLING OF STADIUM UPLIGHT STRUCTURES

RELATED APPLICATIONS

This application claims the benefit of U.S. Provisional Application No. 63/552,020, filed Feb. 9, 2025, the entire contents of which are incorporated herein by reference.

TECHNICAL FIELD

The disclosure relates to the activation and deactivation of stadium lights.

BACKGROUND OF THE INVENTION

Many sports fields and outdoor venues include lighting structures so that the premises can be utilized during the evening and nighttime hours. These lighting structures generally include downlights to light the surface of the premises. However, many purposes for the venues also require the use of uplights. For instance, in baseball or softball, if a ball were to be hit as a pop fly and the ball reached an apex that was above the location of the downlights, then players on the field would lose sight of the baseball as the ball was hidden by the night. By pointing some lights upwards, the ball can remain illuminated as it travels above the lighting structures. However, when these venues are integrated into communities, the presence of the uplights can create light pollution in those communities, frustrating nearby residents and wasting electricity as the uplights may be needed only on occasion but are unpredictable in when they may be needed.

SUMMARY OF THE INVENTION

In general, the disclosure describes a system including one or more lighting structures, each lighting structure comprising one or more uplights. The system further includes one or more sensors each directed towards a common focal area and a computing device in communication with each of the one or more sensors. The computing device includes one or more processors configured to control the one or more sensors to capture data descriptive of a ball moving above the common focal area. Based on the data, the one or more processors predict a motion characteristic of the ball, such as any one or more of an ascension rate, lateral rate of movement, or an apex of a predicted path of the ball, and compare the motion characteristic to a threshold motion characteristic. In response to the motion characteristic being greater than or equal to the threshold motion characteristic, the one or more processors activate at least one of the one or more uplights.

By utilizing these systems and techniques, venues and fields may see a number of benefits. By selectively activating the uplights only in response to a detected event of a ball ascending at a rate where the ball would reach a level in the sky above where uplights would be needed for visualization of the ball, the players and spectators at the field level can have a full, unhindered experience without requiring the uplights to be on continuously as a default. This will reduce the light pollution experienced by those in the surrounding communities, and also reduce the electricity consumed at the venue. This will further extend the longevity of the bulbs used in the uplights, as the use of those bulbs may be significantly reduced.

In one example, the disclosure is directed to a method in which one or more processors control one or more sensors to capture data descriptive of a ball moving above a common focal area, wherein each of the one or more sensors are directed at the common focal area. The method further includes, based on the data, predicting, by the one or more processors, a motion characteristic of the ball. The method also includes comparing, by the one or more processors, the motion characteristic to a threshold motion characteristic. The method further includes in response to the motion characteristic being greater than or equal to the threshold motion characteristic, activating, by the one or more processors, at least one of the one or more uplights in the at least one of the one or more lighting structures.

In another example, the disclosure is directed to a system comprising one or more lighting structures, each lighting structure comprising one or more uplights, one or more sensors each directed towards a common focal area, and a computing device in communication with each of the one or more sensors. The computing device includes one or more processors configured to control the one or more sensors to capture data descriptive of a ball moving above the common focal area. The one or more processors are further configured to, based on the data, predict a motion characteristic of the ball. The one or more processors are also configured to compare the motion characteristic to a threshold motion characteristic. The one or more processors are further configured to, in response to the apex of the predicted path being greater than or equal to the threshold motion characteristic, activate at least one of the one or more uplights in at least one of the one or more lighting structures.

In another example, the disclosure is directed to a non-transitory computer-readable storage medium having stored thereon instructions that, when executed, cause one or more processors of a computing device to control one or more sensors to capture data descriptive of a ball moving above a common focal area, wherein each of the one or more sensors are directed at the common focal area. The instructions, when executed, further cause the one or more processors to, based on the data, predict a motion characteristic of the ball. The instructions, when executed, also cause the one or more processors to compare the motion characteristic to a threshold motion characteristic. The instructions, when executed, further cause the one or more processors to, in response to the motion characteristic being greater than or equal to the threshold motion characteristic, activate at least one of the one or more uplights in the at least one of the one or more lighting structures.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

The following drawings are illustrative of particular examples of the present disclosure and therefore do not limit the scope of the invention. The drawings are not necessarily to scale, though examples can include the scale illustrated, and are intended for use in conjunction with the explanations in the following detailed description wherein like reference characters denote like elements. Examples of the present disclosure will hereinafter be described in conjunction with the appended drawings.

DETAILED DESCRIPTION

The following detailed description is exemplary in nature and is not intended to limit the scope, applicability, or configuration of the techniques or systems described herein in any way. Rather, the following description provides some practical illustrations for implementing examples of the techniques or systems described herein. Those skilled in the art will recognize that many of the noted examples have a variety of suitable alternatives.

Figure 1:
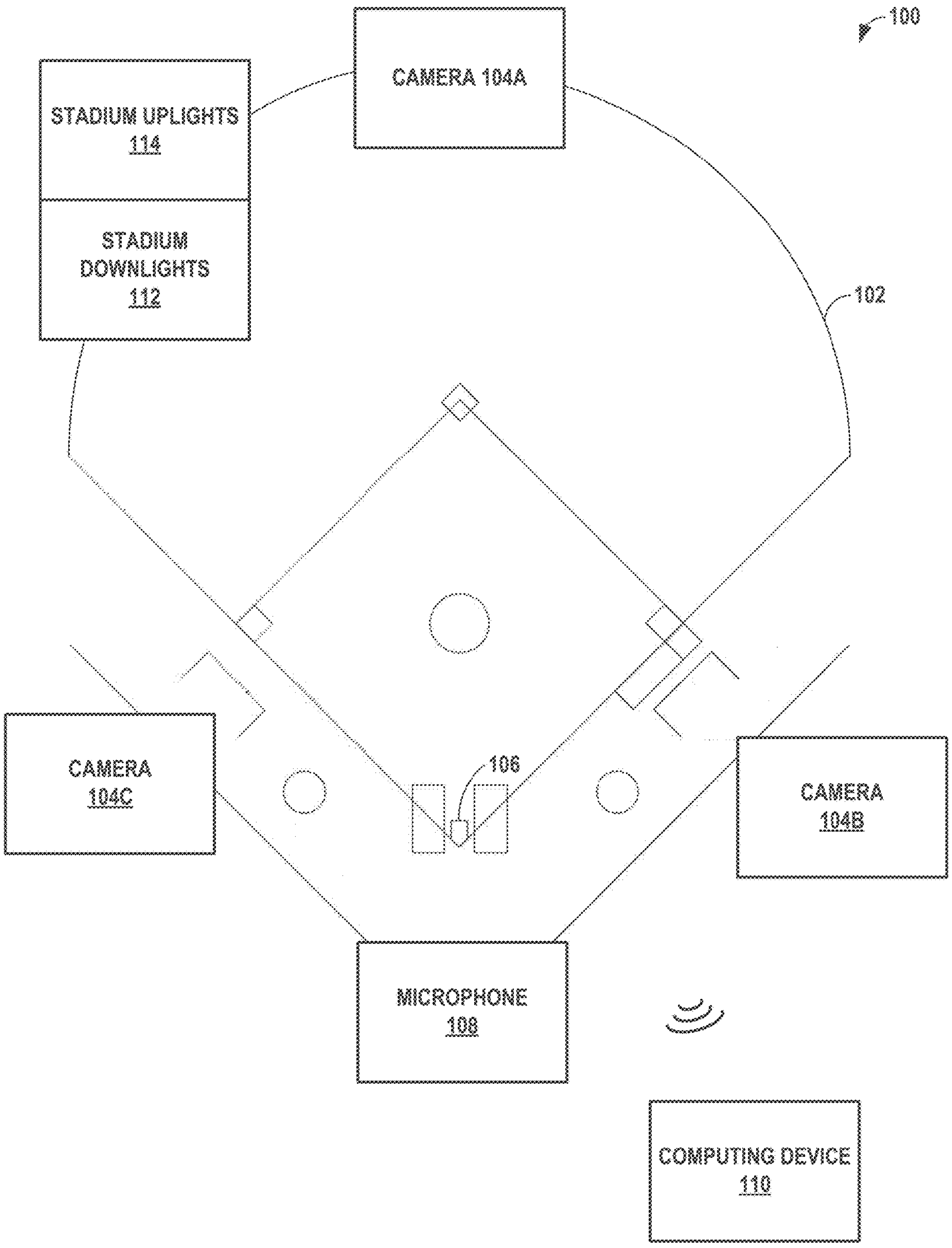
FIG. 1 is a conceptual diagram illustrating a sports field with sensors, a computing device, and an uplight structure controlled by the computing device based on the data measured by the sensors, in accordance with the techniques of this disclosure.

FIG. 1 is a conceptual diagram illustrating a sports field with sensors 104A-104C and 108, a computing device 110, and an uplight structure 114 controlled by the computing device 110 based on the data measured by the sensors, in accordance with the techniques of this disclosure. While the example of FIG. 1 illustrates automatic uplighting system 100 with three instances of cameras 104 and one instance of microphone 108, other instances of automatic uplighting system 100 may include more cameras or fewer cameras and more or fewer microphones. For instance, automatic uplighting system 100 may only include cameras 104A and 104B, cameras 104A and 104C, or any other combination of cameras, including only camera 104B or 104C if those cameras are stereoscopic cameras (e.g., camera 104B may be a system of two cameras arranged to function as a stereoscopic system).

Computing device 110 may be any computer with the processing power required to adequately execute the techniques described herein. For instance, computing device 110 may be any one or more of a mobile computing device (e.g., a smartphone, a tablet computer, a laptop computer, etc.), a desktop computer, a smarthome component (e.g., a computerized appliance, a home security system, a control panel for home components, a lighting system, a smart power outlet, etc.), a wearable computing device (e.g., a smart watch, computerized glasses, a heart monitor, a glucose monitor, smart headphones, etc.), a virtual reality/augmented reality/extended reality (VR/AR/XR) system, a video game or streaming system, a network modem, router, or server system, or any other computerized device that may be configured to perform the techniques described herein.

Cameras 104 may be any camera capable of recording a video stream and transmitting that video stream to computing device 110, either wirelessly or through a wired connection. Each of cameras 104 may be directed at home plate 106 (or an area above or around home plate 106 such that one or both batter's boxes are included in a video stream captured by each of cameras 104) such that home plate 106 (or the surrounding area) is a common focal area in each of the video streams recorded by the respective one of cameras 104, meaning that home plate 106 (or the surrounding area) is present and visible in the video streams at least when no obstructions are on sports field 102.

Microphone 108 may be any audio recording device, including any audio recording device physically incorporated into any of cameras 104. Microphone 108 may be any audio recording device capable of recording audio from venue 100 and transmit that audio data to computing device 110, either wirelessly or through a wired connection. Microphone 108 may be a directional microphone to reduce noise pollution. In some instances, microphone 108 may be an array of microphones such that the sound data between each of the microphones in the array can be compared to determine a direction of the hit of the ball.

Downlights 112 and uplights 114 may be lighting elements, such as LED lights, incandescent lights, fluorescent lights, HID lights, or any other lights suitable for a stadium-like venue to illuminate large areas from an elevated fixture, such as sports field 102. Downlights 112 may be any lighting element that is directed at any angle between being substantially parallel to the ground and downwards perpendicular to the ground such that downlights illuminate portions of the sports venue or the ground below. Uplights 114 may be any lighting element that is directed at any angle between being substantially parallel to the ground and upwards perpendicular away from the ground such that the uplights illuminate portions of the sky or higher-elevated portions of the premises.

In many sports fields and outdoor venues, lighting structures play a significant role in enabling activities during evening and nighttime hours. These lighting structures typically include downlights to illuminate the playing surface. However, certain sports, such as baseball or softball, require additional lighting solutions to address specific challenges. For instance, when a ball is hit as a pop fly, the ball may ascend to a height above the downlights, causing players to lose sight of the ball against the night sky. This situation requires the use of uplights to maintain visibility of the ball as it travels above the lighting structures.

Despite the utility of uplights, their continuous operation can lead to significant drawbacks. One significant issue is light pollution, which can disturb nearby communities and detract from the natural night environment. Additionally, the constant use of uplights results in unnecessary energy consumption, leading to increased operational costs and environmental impact. Furthermore, the frequent activation of uplights can reduce the lifespan of the lighting elements, necessitating more frequent maintenance and replacement.

In accordance with the techniques described herein, computing device 110 controls one or more sensors 104A-104C and 108 to capture data descriptive of a ball moving above a common focal area, wherein each of the one or more sensors 104A-104C and 108 are directed at the common focal area. In some instances, such as when using only microphones 108, the common focal area may be as large as the entire field of play, with different microphones being directed at different portions of the common focal area in order to calculate sound waves in different areas and predict different directions for the hit. This data could include, in some instances where cameras are utilized, pixel value differences between frames of video data. Based on the data, computing device 110 predicts a motion characteristic of the ball, such as any one or more of an ascension rate, lateral rate of movement, or an apex of a predicted path of the ball. Computing device 110 compares the apex of the predicted path to a threshold motion characteristic, which may indicate that the ball is likely to rise above a height at or above the lighting structure where uplights 114 may be necessary to view the ball in a night sky. In response to the motion characteristic being greater than or equal to the threshold motion characteristic, computing device 110 activates the at least one of the one or more uplights in the at least one of the one or more lighting structures.

The present system addresses these challenges by providing a method that intelligently controls the activation of uplights based on real-time data. The system includes one or more lighting structures, each with uplights, and is equipped with sensors directed towards a common focal area. A computing device communicates with these sensors to capture data descriptive of a ball's movement. By predicting a motion characteristic of the ball, such as its ascension rate or trajectory, and comparing it to a threshold, the system selectively activates the uplights only when necessary. This approach minimizes light pollution, reduces energy consumption, and extends the lifespan of the lighting elements, thereby offering a more efficient and environmentally friendly solution for sports venues.

To detect the ball, a variety of methods such as background subtraction or object detection may be used. Other filters may be added to remove false positives and improve the accuracy of ball detection.

In background subtraction the goal is to identify and localize non-stationary objects by comparing consecutive frames of the same scene. When this method is used, one or more cameras may be aimed from behind the batter upward to make sure the ball is captured right after a hit. Additionally, the background of the ball may be the sky to make sure the moving object is a ball.

Since planes, stars, flying bugs, and other objects may enter this view of the camera, several filters may be added to remove such objects and accurately detect the ball. These filters may include, but are not limited to, blurring (e.g., to reduce the localized effect of changes in pixel value in a small scale, such as for far objects), removing by an object's size since a ball's size is known, filtering out random motions (e.g., such as bug motion that goes left and right and not on a straight path), and filtering out low speed objects (e.g., planes in the sky have a much slower movement between two frames in comparison to baseball since planes are far relative to ball).

In object detection, models based on deep learning may be used that implement techniques such as convolution neural network or transformers. Pre-trained models may be used but to improve the accuracy of object detectors, video/image data collection, ball labeling in those images, and model training can be done.

To estimate the trajectory of the ball and its apex two methods can be used. The first method includes a single camera that is non-stereoscopic. In this approach the detected ball may be tracked in a few frames and by calculation of its two-dimensional direction of motion and rate of change of its location along each of the axes of the two-dimensional image (e.g., from the camera), as well as the location of the camera with regards to the batter box, the ball trajectory can be estimated.

For instance, if camera is on the backstop, such as 10 ft right behind the batter box and at 8 ft elevation. Assuming a ball is hit straight from the batter toward the field and steeply upward, the two-dimensional images will show that the ball does not have much lateral motion (along x-axis) while its vertical motion (along y-axis) is fast. This tells the computing device that the ball is moving upward and away from the batter.

As such, computing device 110 expects that rate of change in y location of the ball drops quickly (e.g., the ball goes away more than upward), so if this rate drops slowly, computing device 110 may determine that it is at a more vertical angle (going up more than out). Conversely, if this rate drops quickly, computing device 110 may determine that the ball is travelling out more than up.

The second method for estimating the trajectory of the ball and its apex is using multiple cameras and/or stereoscopic cameras. In this approach, the ball may be detected in two cameras and its exact location (with intrinsic errors of the approach) will be calculated. Then the exact trajectory will be estimated and apex will be calculated based on the motion characteristic of the ball.

In this approach, computing device 110 may dewarp the images, as well as calibrate the cameras. Camera calibration is sensitive and any movement of each camera, or any vibration during the implementation at the field may introduce errors.

In many instances, the time between a bat making contact with a ball and the ball reaching a height where uplights are necessary can be very quick, such as less than a second. As such, the processing to determine that uplights should be activated and the actual activation of such uplights may be fast enough such that the ball does not reach the height at which uplights are necessary prior to the uplights being activated.

Figure 2:
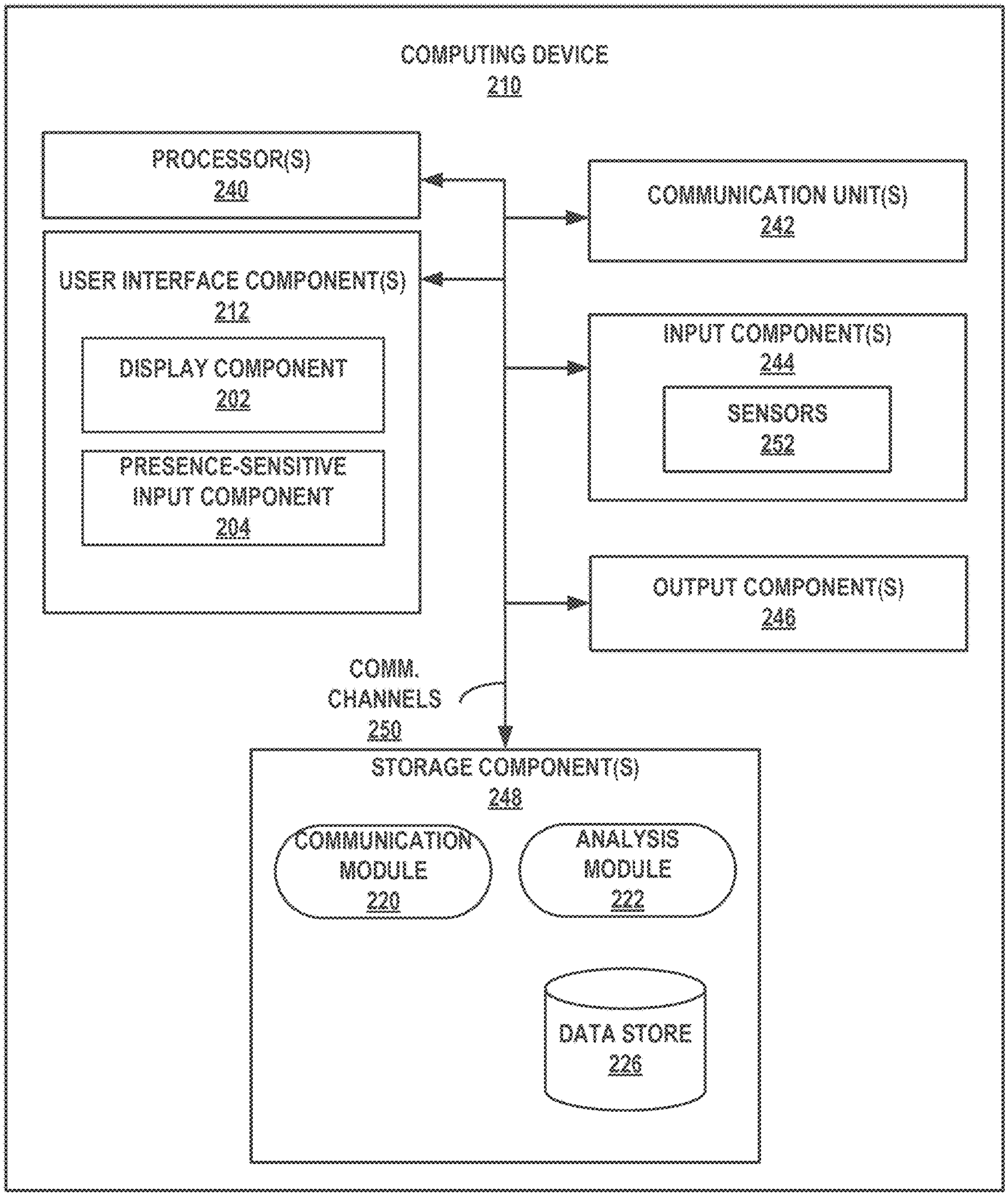
FIG. 2 is a block diagram illustrating a more detailed example of a computing device configured to perform the techniques described herein.

FIG. 2 is a block diagram illustrating a more detailed example of a computing device configured to perform the techniques described herein. Computing device 210 of FIG. 2 is described below as an example of computing device 110 of FIG. 1. FIG. 2 illustrates only one particular example of computing device 210, and many other examples of computing device 210 may be used in other instances and may include a subset of the components included in example computing device 210 or may include additional components not shown in FIG. 2.

Computing device 210 may be similar to computing device 110 and may be any computer with the processing power required to adequately execute the techniques described herein. For instance, computing device 210 may be any one or more of a mobile computing device (e.g., a smartphone, a tablet computer, a laptop computer, etc.), a desktop computer, a smarthome component (e.g., a computerized appliance, a home security system, a control panel for home components, a lighting system, a smart power outlet, etc.), a vehicle, a wearable computing device (e.g., a smart watch, computerized glasses, a heart monitor, a glucose monitor, smart headphones, etc.), a virtual reality/augmented reality/extended reality (VR/AR/XR) system, a video game or streaming system, a network modem, router, or server system, or any other computerized device that may be configured to perform the techniques described herein.

As shown in the example of FIG. 2, computing device 210 includes user interface components (UIC) 212, one or more processors 240, one or more communication units 242, one or more input components 244, one or more output components 246, and one or more storage components 248. UIC 212 includes display component 202 and presence-sensitive input component 204. Storage components 248 of computing device 210 include communication module 220, analysis module 222, and data store 226.

One or more processors 240 may implement functionality and/or execute instructions associated with computing device 210 to control one or more sensors and to activate or deactivate stadium uplights. That is, processors 240 may implement functionality and/or execute instructions associated with computing device 210 to detect whether an object travels according to a threshold motion characteristic and responsively activate stadium uplights in the event that the object is above the set threshold.

Examples of processors 240 include any combination of application processors, display controllers, auxiliary processors, one or more sensor hubs, and any other hardware configured to function as a processor, a processing unit, or a processing device, including dedicated graphical processing units (GPUs). Modules 220 and 222 may be operable by processors 240 to perform various actions, operations, or functions of computing device 210. For example, processors 240 of computing device 210 may retrieve and execute instructions stored by storage components 248 that cause processors 240 to perform the operations described with respect to modules 220 and 222. The instructions, when executed by processors 240, may cause computing device 210 to detect whether an object travels according to a threshold motion characteristic and responsively activate stadium uplights in the event that the object is above the set threshold.

Communication module 220 may execute locally (e.g., at processors 240) to provide functions associated with managing the sensors to measure data and control the uplights. In some examples, communication module 220 may act as an interface to a remote service accessible to computing device 210. For example, communication module 220 may be an interface or application programming interface (API) to a remote server that controls audio and video recording devices to capture data on a sports field and to send activation and deactivation commands to the stadium uplights.

In some examples, analysis module 222 may execute locally (e.g., at processors 240) to provide functions associated with analyzing the received sensor data and determining whether uplights should be activated. In some examples, analysis module 222 may act as an interface to a remote service accessible to computing device 210. For example, analysis module 222 may be an interface or application programming interface (API) to a remote server that analyzes the received sensor data and determines whether uplights should be activated.

One or more storage components 248 within computing device 210 may store information for processing during operation of computing device 210 (e.g., computing device 210 may store data accessed by modules 220 and 222 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220 and 222 and data store 226. Storage components 248 may include a memory configured to store data or other information associated with modules 220 and 222 and data store 226.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on one or more networks. Examples of communication units 242 include a network interface card (e.g., such as an Ethernet card), an optical transceiver, a radio frequency transceiver, a GPS receiver, a radio-frequency identification (RFID) transceiver, a near-field communication (NFC) transceiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 244 of computing device 210, in one example, include a presence-sensitive input device (e.g., a touch sensitive screen, a PSD), mouse, keyboard, voice responsive system, camera, microphone or any other type of device for detecting input from a human or machine. In some examples, input components 244 may include one or more sensor components (e.g., sensors 252). Sensors 252 may include one or more biometric sensors (e.g., fingerprint sensors, retina scanners, vocal input sensors/microphones, facial recognition sensors, cameras), one or more location sensors (e.g., GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a radar sensor, a lidar sensor, a sonar sensor, a heart rate sensor, magnetometer, glucose sensor, olfactory sensor, compass sensor, or a step counter sensor.

One or more output components 246 of computing device 210 may generate output in a selected modality. Examples of modalities may include a tactile notification, audible notification, visual notification, machine generated voice notification, or other modalities. Output components 246 of computing device 210, in one example, include a presence-sensitive display, a sound card, a video graphics adapter card, a speaker, a cathode ray tube (CRT) monitor, a liquid crystal display (LCD), a light emitting diode (LED) display, an organic LED (OLED) display, a virtual/augmented/extended reality (VR/AR/XR) system, a three-dimensional display, or any other type of device for generating output to a human or machine in a selected modality.

UIC 212 of computing device 210 may include display component 202 and presence-sensitive input component 204. Display component 202 may be a screen, such as any of the displays or systems described with respect to output components 246, at which information (e.g., a visual indication) is displayed by UIC 212 while presence-sensitive input component 204 may detect an object at and/or near display component 202.

While illustrated as an internal component of computing device 210, UIC 212 may also represent an external component that shares a data path with computing device 210 for transmitting and/or receiving input and output. For instance, in one example, UIC 212 represents a built-in component of computing device 210 located within and physically connected to the external packaging of computing device 210 (e.g., a screen on a mobile phone). In another example, UIC 212 represents an external component of computing device 210 located outside and physically separated from the packaging or housing of computing device 210 (e.g., a monitor, a projector, etc. that shares a wired and/or wireless data path with computing device 210).

UIC 212 of computing device 210 may detect two-dimensional and/or three-dimensional gestures as input from a user of computing device 210. For instance, a sensor of UIC 212 may detect a user's movement (e.g., moving a hand, an arm, a pen, a stylus, a tactile object, etc.) within a threshold distance of the sensor of UIC 212. UIC 212 may determine a two or three-dimensional vector representation of the movement and correlate the vector representation to a gesture input (e.g., a hand-wave, a pinch, a clap, a pen stroke, etc.) that has multiple dimensions. In other words, UIC 212 can detect a multi-dimension gesture without requiring the user to gesture at or near a screen or surface at which UIC 212 outputs information for display. Instead, UIC 212 can detect a multi-dimensional gesture performed at or near a sensor which may or may not be located near the screen or surface at which UIC 212 outputs information for display.

In accordance with the techniques of this disclosure, a system may include one or more lighting structures, each lighting structure including one or more uplights. In some instances, each of the one or more lighting structures further includes one or more downlights. In such instances, each of the one or more downlights are configured to initially be in an activated state, and each of the one or more uplights are configured to initially be in a deactivated state.

Communication module 220 may control one or more sensors to capture data descriptive of a ball or some other object moving above the common focal area. The one or more sensors may include one or more cameras and/or one or more directional microphones. The common focal area may be a batter's area of a sports field, or may be an entire field of play that includes the batter's area of the sports field, or may be any other percentage of the full field of play that includes at least one of the batter's boxes of the sports field.

Based on the data, analysis module 222 may predict a motion characteristic of the ball, such as any one or more of an ascension rate, lateral rate of movement, or an apex of a predicted path of the ball. For instance, if a pitch is not contacted by or weakly contacted by a batter, the predicted motion characteristic of the ball may not be available (indicating that the ball will not reach the higher elevations to enter the view of the camera to be detected) or may be small or negative, indicative of the pitch remaining close to the ground (e.g., a low ascension rate or a low apex). However, in instances where contact is made between the bat and the ball, the ball may travel higher in the air with a larger motion characteristic (e.g., a higher ascension rate, a higher lateral rate of movement, and/or a higher apex). Based on a number of factors, analysis module 222 may predict a motion characteristic of the ball after the ball makes contact with the bat, indicating whether the travelling ball would reach a particular height above the ground.

Analysis module 222 may compare the motion characteristic to a threshold motion characteristic. In some instances, the threshold motion characteristic may be a motion characteristic where the ball would reach a height of the one or more uplights in one of the one or more lighting structures, or may be any other predefined, user defined, or dynamically determined height where activating uplights would be beneficial for spectators and/or participants.

In response to the motion characteristic being greater than or equal to the threshold motion characteristic, communication module 220 may activate at least one of the one or more uplights in at least one of the one or more lighting structures.

In activating the at least one of the one or more uplights, communication module 220 may activate the at least one of the one or more uplights in the at least one of the one or more lighting structures for a particular period of time. The particular period of time may be any one or more of a predicted length of time, a predicted length of time added to a user-defined period of time, or the user-defined time. After the expiration of the particular period of time, communication module 220 may deactivate the at least one of the one or more uplights in the at least one of the one or more lighting structures.

By activating the uplights for a specific period and then deactivating them after this period expires, the system allows for precise control over the duration of uplight activation, which can be tailored to the specific needs of the event or venue. By allowing the uplights to be activated only for a predetermined period, the system reduces unnecessary energy consumption and minimizes light pollution, which is particularly beneficial in community-integrated venues. This approach also extends the lifespan of the lighting elements by reducing their operational time, thereby decreasing maintenance costs and resource usage. The ability to define the activation period provides flexibility and adaptability to different scenarios, ensuring that the lighting system can be optimized for various events and conditions.

In some instances, based on the predicted motion characteristic of the ball, analysis module 222 may predict a length of time until a descent of the ball naturally occurring due to gravity acting on the ball, either by affecting an ascension rate or based on the predicted path of the ball, causes a height of the ball to fall below a particular height. Analysis module 222 may define the particular period of time based on the predicted length of time.

By predicting the length of time until the ball's descent causes its height to fall below a threshold height, and then defining the period of time for which the uplights remain activated based on this prediction, the system allows for precise control over the duration of uplight activation, ensuring that the lights are only on for the required time to illuminate the ball's trajectory. This reduces unnecessary energy consumption and minimizes light pollution, as the uplights are not activated for longer than needed. By dynamically adjusting the activation period based on real-time predictions of the ball's path, the system optimizes the use of lighting resources, enhancing the efficiency of the lighting system while maintaining visibility for players and spectators. This approach contrasts with traditional systems, offering a more responsive and environmentally friendly solution.

In some instances, communication module 220 may control the one or more cameras to capture the data descriptive of the ball moving around the common focal area by controlling the one or more cameras, each directed towards at least some portion of the common focal area, to capture a respective video stream. For instance, this could be an instance where stereoscopic cameras are used or where multiple cameras are used non-stereoscopically (when epipolar geometry is not used). It should be noted that the common focal area may be large, and cameras may or may not have overlapping views. For example, one camera may be pointed at a right-handed batter's box, and a second camera may be pointed at a left-handed batter's box, with those two cameras possibly or possibly not having portions of those images being in both video streams, with the common focal area being defined as the general batter's area or the infield. Analysis module 222 may identify the ball within one or more of the video streams and identify that the ball passed above a preliminary height in the one or more of the video streams at a first time. Based on a respective position of the ball in one or more frames timestamped near the first time of the one or more video streams, analysis module 222 may determine one or more of a velocity of the ball, a trajectory of the ball, and a rate of ascension of the ball. Based on the one or more of the velocity, the trajectory, and the rate of ascension, analysis module 222 may determine a predicted path of the ball.

By controlling cameras to capture video streams of a ball moving above a common focal area, identifying the ball within these streams, and determining the ball's velocity, trajectory, and rate of ascension, the system allows for precise tracking and prediction of the ball's path, enabling the system to assess whether the ball's predicted path will reach a height where uplights become necessary. By using video streams to analyze the ball's motion, the system can dynamically and accurately predict the ball's trajectory, ensuring that uplights are activated only when needed. This reduces unnecessary light pollution and energy consumption, as the uplights are not activated continuously but only in response to specific conditions. The use of cameras to capture and analyze the ball's motion provides a more reliable and efficient method for determining when uplights need to be activated, compared to current systems. This approach enhances the overall functionality of the lighting system by integrating real-time data analysis, leading to improved operational efficiency and environmental benefits.

In some such instances, analysis module 222 may further determine whether the predicted path of the ball is towards a field of play. Communication module 220 may activate the at least one of the one or more uplights only when the predicted path of the ball is towards the field of play and has a motion characteristic greater than or equal to the threshold motion characteristic.

In some instances, communication module 220 may control the one or more directional microphones to capture the data descriptive of the ball moving around the common focal area by controlling the one or more directional microphones, each directed towards some portion of the common focal area, to capture a respective audio stream. Analysis module 222 may analyze the one or more audio streams to detect an audio pattern classified as a hit audio pattern (e.g., an audio pattern that resembles a bat hitting the ball). In response to detecting the audio pattern classified as the hit pattern, analysis module 222 may analyze audio data in the audio pattern. The hit audio pattern may be defined by one or more of a decibel level of the audio data, a frequency of the audio data, an amplitude of the audio data, a spectrogram of the audio data, and a gradient of the audio data. In analyzing the audio data in the audio pattern, analysis module 222 may determine the motion characteristic or projected path of the ball based on the audio pattern.

By controlling directional microphones to capture audio data descriptive of a ball moving above a common focal area, analyzing the audio streams to detect a hit audio pattern, and upon detection, further analyzing the audio data within this pattern, the system allows for the detection of a ball's motion based on sound, which can be particularly useful in environments where visual data might be obstructed or insufficient. By utilizing directional microphones, the system can focus on specific areas, reducing noise interference from other parts of the venue. This method provides an alternative to visual tracking, offering a reliable way to determine the ball's trajectory and motion characteristics even in low visibility conditions. The use of audio patterns to infer motion characteristics can enhance the accuracy of the system in activating uplights only when necessary, thereby conserving energy and reducing light pollution.

By utilizing these systems and techniques, venues and fields may see a number of benefits. By selectively activating the uplights only in response to a detected event of a ball having a motion characteristic where it would be expected that the ball reaches a level in the sky above where uplights would be needed for visualization of the ball, the players and spectators at the field level can have a full, unhindered experience without requiring the uplights to be on continuously as a default. This will reduce the light pollution experienced by those in the surrounding communities, and also reduce the electricity consumed at the venue. This will further extend the longevity of the bulbs used in the uplights, as the use of those bulbs may be significantly reduced.

Figure 3:
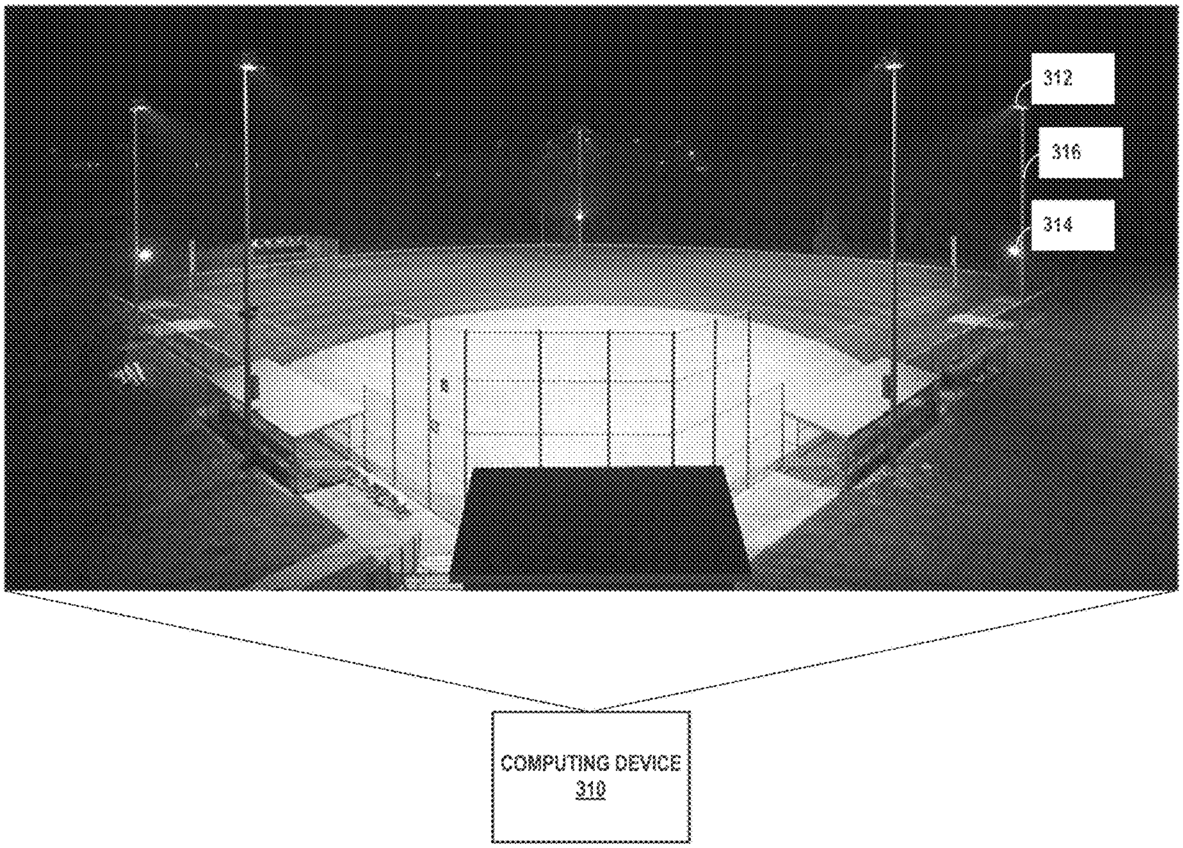
FIG. 3 is a conceptual diagram illustrating an example uplight structure controlled by a computing device, in accordance with the techniques of this disclosure.

FIG. 3 is a conceptual diagram illustrating an example uplight structure controlled by a computing device, in accordance with the techniques of this disclosure. In the example of FIG. 3, lighting structure 316 may include one or more downlights 312 and one or more uplights 314. Downlights 312 and uplights 314 may be lighting elements, such as LED lights, incandescent lights, fluorescent lights, HID lights, or any other lights suitable for a stadium-like venue to illuminate large areas from an elevated fixture.

Downlights 312 may be any lighting element that is directed at any angle between being substantially parallel to the ground and downwards perpendicular to the ground such that downlights illuminate portions of the sports venue or the ground below. Uplights 314 may be any lighting element that is directed at any angle between being substantially parallel to the ground and upwards perpendicular away from the ground such that the uplights illuminate portions of the sky or higher-elevated portions of the premises.

Computing device 310 may be similar to computing device 110 and may be any computer with the processing power required to adequately execute the techniques described herein. For instance, computing device 310 may be any one or more of a mobile computing device (e.g., a smartphone, a tablet computer, a laptop computer, etc.), a desktop computer, a smarthome component (e.g., a computerized appliance, a home security system, a control panel for home components, a lighting system, a smart power outlet, etc.), a vehicle, a wearable computing device (e.g., a smart watch, computerized glasses, a heart monitor, a glucose monitor, smart headphones, etc.), a virtual reality/augmented reality/extended reality (VR/AR/XR) system, a video game or streaming system, a network modem, router, or server system, or any other computerized device that may be configured to perform the techniques described herein.

In accordance with the techniques of this disclosure, computing device 310 controls one or more sensors to capture data descriptive of a ball moving above a common focal area, wherein each of the one or more sensors are directed at the common focal area. Based on the data, computing device 310 predicts a motion characteristic of the ball, such as any one or more of an ascension rate, lateral rate of movement, or an apex of a predicted path of the ball. Computing device 310 compares the motion characteristic to a threshold motion characteristic, which may be a rate where it would be expected that the ball would reach a height where uplights 314 would help fielders visualize a ball against the night sky, or which may be any other height above which uplights 314 would be beneficial if illuminated. In response to the motion characteristic being greater than or equal to the threshold motion characteristic, computing device 310 activates the at least one of the one or more uplights in the at least one of the one or more lighting structures.

Figure 4:
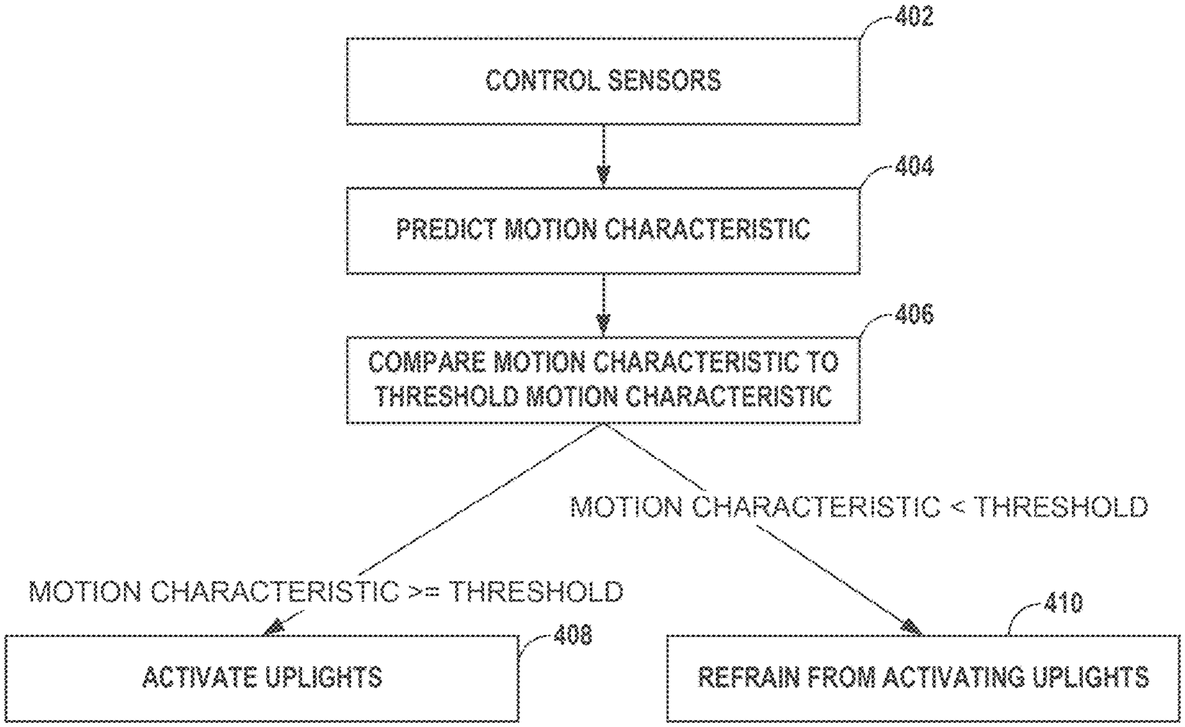
FIG. 4 is a flow diagram illustrating a method by which a computing device controls an uplighting structure based on sensor data, in accordance with the techniques of this disclosure.

FIG. 4 is a flow diagram illustrating a method by which a computing device controls an uplighting structure based on sensor data, in accordance with the techniques of this disclosure. The techniques of FIG. 4 may be performed by one or more processors of a computing device, such as system 100 of FIG. 1 and/or computing device 210 illustrated in FIG. 2. For purposes of illustration only, the techniques of FIG. 4 are described within the context of computing device 210 of FIG. 2, although computing devices having configurations different than that of computing device 210 may perform the techniques of FIG. 4.

In accordance with the techniques of this disclosure, communication module 220 controls one or more sensors to capture data descriptive of a ball moving above a common focal area, wherein each of the one or more sensors are directed at the common focal area (402). Based on the data, analysis module 222 predicts a motion characteristic of the ball (404), such as any one or more of an ascension rate, lateral rate of movement, or an apex of a predicted path of the ball. Analysis module 222 compares the motion characteristic to a threshold motion characteristic (406). In response to the motion characteristic being greater than or equal to the threshold motion characteristic, communication module 220 activates the at least one of the one or more uplights in the at least one of the one or more lighting structures (408). Conversely, in response to the motion characteristic being less than the threshold motion characteristic, communication module 220 refrains from activating the one of the one or more uplights (410).

The techniques in FIG. 4 describe a system that includes lighting structures with uplights, sensors directed towards a common focal area, and a computing device that processes data from the sensors to, for instance, predict the apex of a ball's path (or some other motion characteristic). The system activates uplights when the motion characteristic exceeds a threshold. This arrangement allows for the dynamic and efficient use of uplights, reducing unnecessary light pollution and energy consumption by only activating the lights when needed. The computing device's ability to predict the motion characteristic and compare it to a threshold ensures that uplights are used optimally, providing adequate illumination for players and spectators without being continuously active. This system is particularly advantageous in community-integrated venues where minimizing light pollution is important. The use of sensors and a computing device to automate the lighting process represents an improvement over traditional manual or time-based lighting systems, offering a more responsive and environmentally friendly solution.

Example 1. A system comprising: one or more lighting structures, each lighting structure comprising one or more uplights; one or more sensors each directed towards a common focal area; and a computing device in communication with each of the one or more sensors, the computing device comprising one or more processors configured to: control the one or more sensors to capture data descriptive of a ball moving above the common focal area; based on the data, predict a motion characteristic of the ball; compare the motion characteristic to a threshold motion characteristic; in response to the motion characteristic being greater than or equal to the threshold motion characteristic, activate at least one of the one or more uplights in at least one of the one or more lighting structures.

Example 2. The system of example 1, wherein the one or more processors being configured to activate the at least one of the one or more uplights comprises the one or more processors being configured to: activate the at least one of the one or more uplights in the at least one of the one or more lighting structures for a particular period of time; and after the expiration of the particular period of time, deactivate the at least one of the one or more uplights in the at least one of the one or more lighting structures.

Example 3. The system of example 2, wherein the particular period of time is a user-defined period of time.

Example 4. The system of example 2, wherein the one or more processors are further configured to: based on the motion characteristic of the ball, predict a length of time until a descent of the ball causes a height of the ball to fall below a threshold height; and define the particular period of time based on the predicted length of time.

Example 5. The system of example 4, wherein the particular period of time comprises one or more of: the predicted length of time; and the predicted length of time added to a user-defined period of time.

Example 6. The system of any one or more of examples 1-5, wherein the one or more sensors comprise one or more cameras.

Example 7. The system of example 6, wherein the one or more processors being configured to control the one or more cameras to capture the data descriptive of the ball moving above the common focal area comprises the one or more processors being configured to: control the one or more cameras, each directed towards a respective portion of the common focal area, to capture a respective video stream; identify the ball within one or more of the video streams; identify that the ball passed above a preliminary height in the one or more of the video streams at a first time; based on a respective position of the ball in one or more frames timestamped near the first time of the one or more video streams, determine one or more of a velocity of the ball, a trajectory of the ball, and a rate of ascension of the ball; and based on the one or more of the velocity, the trajectory, and the rate of ascension, determine a predicted path of the ball.

Example 8. The system of example 7, wherein the one or more processors are further configured to: determine whether the predicted path of the ball is towards a field of play; and activate the at least one of the one or more uplights only when the predicted path of the ball has the motion characteristic greater than or equal to the threshold motion characteristic and is towards the field of play.

Example 9. The system of any one or more of examples 1-8, wherein the one or more sensors comprise one or more directional microphones.

Example 10. The system of example 9, wherein the one or more processors being configured to control the one or more directional microphones to capture the data descriptive of the ball moving above the common focal area comprises the one or more processors being configured to: control the one or more directional microphones, each directed towards a portion of the common focal area, to capture a respective audio stream; analyze the one or more audio streams to detect an audio pattern classified as a hit audio pattern; and in response to detecting the audio pattern classified as the hit pattern, analyze audio data in the audio pattern.

Example 11. The system of example 10, wherein the hit audio pattern is defined by one or more of a decibel level of the audio data, a frequency of the audio data, an amplitude of the audio data, a spectrogram of the audio data, and a gradient of the audio data.

Example 12. The system of any one or more of examples 10-11, wherein the one or more processors being configured to analyze the audio data in the audio pattern comprises the one or more processors being configured to: determine a motion characteristic of the ball based on the audio pattern.

Example 13. The system of any one or more of examples 1-12, wherein the threshold motion characteristic comprises a motion characteristic where the ball would reach a height of the one or more uplights in one of the one or more lighting structures.

Example 14. The system of any one or more of examples 1-13, wherein each of the one or more lighting structures further comprise one or more downlights, wherein each of the one or more downlights are configured to initially be in an activated state, and wherein each of the one or more uplights are configured to initially be in a deactivated state.

Example 15. The system of any one or more of examples 1-14, wherein the common focal area comprises an area that includes a batter's area of a sports field.

Example 16. A method comprising: controlling, by one or more processors, one or more sensors to capture data descriptive of a ball moving above a common focal area, wherein each of the one or more sensors are directed at the common focal area; based on the data, predicting, by the one or more processors, a motion characteristic of the ball; comparing, by the one or more processors, the motion characteristic to a threshold motion characteristic; in response to the motion characteristic being greater than or equal to the threshold motion characteristic, activating, by the one or more processors, at least one of the one or more uplights in the at least one of the one or more lighting structures.

Example 17. The method of example 16, activating the at least one of the one or more uplights comprises: activating, by the one or more processors, the at least one of the one or more uplights in the at least one of the one or more lighting structures for a particular period of time; and after the expiration of the particular period of time, deactivating, by the one or more processors, the at least one of the one or more uplights in the at least one of the one or more lighting structures.

Example 18. The method of example 17, wherein the particular period of time is a user-defined period of time.

Example 19. The method of example 17, further comprising: based on the predicted path of the ball, predicting, by the one or more processors, a length of time until a descent of the ball causes a height of the ball to fall below a threshold height; and defining, by the one or more processors, the particular period of time based on the predicted length of time.

Example 20. The method of example 19, wherein the particular period of time comprises one or more of: the predicted length of time; and the predicted length of time added to a user-defined period of time.

Example 21. The method of any one or more of examples 16-20, wherein the one or more sensors comprise one or more cameras.

Example 22. The method of example 21, controlling the one or more cameras to capture the data descriptive of the ball moving above the common focal area comprises: controlling, by the one or more processors, the one or more cameras, each directed towards a respective portion of the common focal area, to capture a respective video stream; identifying, by the one or more processors, the ball within one or more of the video streams; identifying, by the one or more processors, that the ball passed above a preliminary height in the one or more of the video streams at a first time; based on a respective position of the ball in one or more frames timestamped near the first time of the one or more video streams, determining, by the one or more processors, one or more of a velocity of the ball, a trajectory of the ball, and a rate of ascension of the ball; and based on the one or more of the velocity, the trajectory, and the rate of ascension, determining, by the one or more processors, a predicted path of the ball.

Example 23. The method of example 22, further comprising: determining, by the one or more processors, whether the predicted path of the ball is towards a field of play; and activating, by the one or more processors, the at least one of the one or more uplights only when the predicted path of the ball has the motion characteristic greater than or equal to the threshold motion characteristic and is towards the field of play.

Example 24. The method of any one or more of examples 16-23, wherein the one or more sensors comprise one or more directional microphones.

Example 25. The method of example 24, controlling the one or more directional microphones to capture the data descriptive of the ball moving above the common focal area comprises: controlling, by the one or more processors, the one or more directional microphones, each directed towards a portion of the common focal area, to capture a respective audio stream; analyzing, by the one or more processors, the one or more audio streams to detect an audio pattern classified as a hit audio pattern; and in response to detecting the audio pattern classified as the hit pattern, analyzing, by the one or more processors, audio data in the audio pattern.

Example 26. The method of example 25, wherein the hit audio pattern is defined by one or more of a decibel level of the audio data, a frequency of the audio data, an amplitude of the audio data, a spectrogram of the audio data, and a gradient of the audio data.

Example 27. The method of any one or more of examples 25-26, analyzing the audio data in the audio pattern comprises: determining, by the one or more processors, the motion characteristic of the ball based on the audio pattern.

Example 28. The method of any one or more of examples 16-27, wherein the threshold motion characteristic comprises a motion characteristic where the ball would reach a height of the one or more uplights in one of the one or more lighting structures.

Example 29. The method of any one or more of examples 16-28, wherein each of the one or more lighting structures further comprise one or more downlights, wherein each of the one or more downlights are configured to initially be in an activated state, and wherein each of the one or more uplights are configured to initially be in a deactivated state.

Example 30. The method of any one or more of examples 16-29, wherein the common focal area comprises an area that includes a batter's area of a sports field.

Example 31. A method for performing any of the techniques of any combination of examples 16-30.

Example 32. A device configured to perform any of the methods of any combination of examples 16-30.

Example 33. An apparatus comprising means for performing any of the method of any combination of examples 16-30.

Example 34. A non-transitory computer-readable storage medium having stored thereon instructions that, when executed, cause one or more processors of a computing device to perform the method of any combination of examples 16-30.

Example 35. A system comprising one or more computing devices configured to perform a method of any combination of examples 16-30.

Example 36. Any of the techniques described herein.

Although the various examples have been described with reference to preferred implementations, persons skilled in the art will recognize that changes may be made in form and detail without departing from the spirit and scope thereof.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

It is contemplated that the various aspects, features, processes, and operations from the various embodiments may be used in any of the other embodiments unless expressly stated to the contrary. Certain operations illustrated may be implemented by a computer executing a computer program product on a non-transient, computer-readable storage medium, where the computer program product includes instructions causing the computer to execute one or more of the operations, or to issue commands to other devices to execute one or more operations.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-alone hardware element and/or as preprogrammed hardware elements (e.g., application specific integrated circuits, FPGAs, and digital signal processors), or other related components.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

While the various systems described above are separate implementations, any of the individual components, mechanisms, or devices, and related features and functionality, within the various system embodiments described in detail above can be incorporated into any of the other system embodiments herein.

The terms "about" and "substantially," as used herein, refers to variation that can occur (including in numerical quantity or structure), for example, through typical measuring techniques and equipment, with respect to any quantifiable variable, including, but not limited to, mass, volume, time, distance, wave length, frequency, voltage, current, and electromagnetic field. Further, there is certain inadvertent error and variation in the real world that is likely through differences in the manufacture, source, or precision of the components used to make the various components or carry out the methods and the like. The terms "about" and "substantially" also encompass these variations. The term "about" and "substantially" can include any variation of 5% or 10%, or any amount-including any integer-between 0% and 10%. Further, whether or not modified by the term "about" or "substantially," the claims include equivalents to the quantities or amounts.

Numeric ranges recited within the specification are inclusive of the numbers defining the range and include each integer within the defined range. Throughout this disclosure, various aspects of this disclosure are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾ This applies regardless of the breadth of the range. Although the various embodiments have been described with reference to preferred implementations, persons skilled in the art will recognize that changes may be made in form and detail without departing from the spirit and scope thereof.

Various examples of the disclosure have been described. Any combination of the described systems, operations, or functions is contemplated. These and other examples are within the scope of the following claims.

The invention claimed is:

1. A system comprising:

one or more lighting structures, each lighting structure comprising one or more uplights;

one or more sensors each directed towards a common focal area, wherein the one or more sensors comprise one or more cameras; and a computing device in communication with each of the one or more sensors, the computing device comprising one or more processors configured to:

control the one or more sensors to capture data descriptive of a ball moving above the common focal area;

based on the data, predict a motion characteristic of the ball;

compare the motion characteristic to a threshold motion characteristic;

in response to the motion characteristic being greater than or equal to the threshold motion characteristic, activate at least one of the one or more uplights in at least one of the one or more lighting structures, wherein the one or more processors being configured to control the one or more cameras to capture the data descriptive of the ball moving above the common focal area comprises the one or more processors being configured to:

control the one or more cameras, each directed towards a respective portion of the common focal area, to capture a respective video stream;

identify the ball within one or more of the video streams;

identify that the ball passed above a preliminary height in the one or more of the video streams at a first time;

based on a respective position of the ball in one or more frames timestamped near the first time of the one or more video streams, determine one or more of a velocity of the ball, a trajectory of the ball, and a rate of ascension of the ball; and based on the one or more of the velocity, the trajectory, and the rate of ascension, determine a predicted path of the ball.

2. The system of claim 1, wherein the one or more processors being configured to activate the at least one of the one or more uplights comprises the one or more processors being configured to:

activate the at least one of the one or more uplights in the at least one of the one or more lighting structures for a particular period of time; and after the expiration of the particular period of time, deactivate the at least one of the one or more uplights in the at least one of the one or more lighting structures.

3. The system of claim 2, wherein the particular period of time is a user-defined period of time.

4. The system of claim 2, wherein the one or more processors are further configured to:

based on the motion characteristic of the ball, predict a length of time until a descent of the ball causes a height of the ball to fall below a threshold height; and define the particular period of time based on the predicted length of time.

5. The system of claim 4, wherein the particular period of time comprises one or more of:

the predicted length of time; and the predicted length of time added to a user-defined period of time.

6. The system of claim 1, wherein the one or more processors are further configured to:

determine whether the predicted path of the ball is towards a field of play; and activate the at least one of the one or more uplights only when the predicted path of the ball has the motion characteristic greater than or equal to the threshold motion characteristic and is towards the field of play.

7. The system of claim 1, wherein the one or more sensors comprise one or more directional microphones.

8. The system of claim 7, wherein the one or more processors being configured to control the one or more directional microphones to capture the data descriptive of the ball moving above the common focal area comprises the one or more processors being configured to:

control the one or more directional microphones, each directed towards a portion of the common focal area, to capture a respective audio stream;

analyze the one or more audio streams to detect an audio pattern classified as a hit audio pattern; and in response to detecting the audio pattern classified as the hit pattern, analyze audio data in the audio pattern.

9. The system of claim 8, wherein the hit audio pattern is defined by one or more of a decibel level of the audio data, a frequency of the audio data, an amplitude of the audio data, a spectrogram of the audio data, and a gradient of the audio data.

10. The system of claim 8, wherein the one or more processors being configured to analyze the audio data in the audio pattern comprises the one or more processors being configured to:

determine the motion characteristic of the ball based on the audio pattern.

11. The system of claim 1, wherein the threshold motion characteristic comprises a motion characteristic where the ball would reach a height of the one or more uplights in one of the one or more lighting structures.

12. The system of claim 1, wherein each of the one or more lighting structures further comprise one or more downlights, wherein each of the one or more downlights are configured to initially be in an activated state, and wherein each of the one or more uplights are configured to initially be in a deactivated state.

13. The system of claim 1, wherein the common focal area comprises an area that includes a batter's area of a sports field.

14. A method comprising:

controlling, by one or more processors, one or more sensors to capture data descriptive of a ball moving above a common focal area, wherein each of the one or more sensors are directed at the common focal area, wherein the one or more sensors comprise one or more cameras;

based on the data, predicting, by the one or more processors, a motion characteristic of the ball;

comparing, by the one or more processors, the motion characteristic to a threshold motion characteristic;

in response to the motion characteristic being greater than or equal to the threshold motion characteristic, activating, by the one or more processors, at least one of the one or more uplights in the at least one of the one or more lighting structures, wherein controlling the one or more cameras to capture the data descriptive of the ball moving above the common focal area comprises:

controlling, by the one or more processors, the one or more cameras, each directed towards a respective portion of the common focal area, to capture a respective video stream;

identifying, by the one or more processors, the ball within one or more of the video streams;

identifying, by the one or more processors, that the ball passed above a preliminary height in the one or more of the video streams at a first time;

based on a respective position of the ball in one or more frames timestamped near the first time of the one or more video streams, determining, by the one or more processors, one or more of a velocity of the ball, a trajectory of the ball, and a rate of ascension of the ball; and based on the one or more of the velocity, the trajectory, and the rate of ascension, determining, by the one or more processors, a predicted path of the ball.

15. The method of claim 14, activating the at least one of the one or more uplights comprises:

activating, by the one or more processors, the at least one of the one or more uplights in the at least one of the one or more lighting structures for a particular period of time; and after the expiration of the particular period of time, deactivating, by the one or more processors, the at least one of the one or more uplights in the at least one of the one or more lighting structures.

16. The method of claim 15, wherein the particular period of time is a user-defined period of time.

17. The method of claim 15, further comprising:

based on the motion characteristic of the ball, predicting, by the one or more processors a length of time until a descent of the ball causes a height of the ball to fall below a threshold height; and defining, by the one or more processors, the particular period of time based on the predicted length of time.

18. The method of claim 17, wherein the particular period of time comprises one or more of:

the predicted length of time; and the predicted length of time added to a user-defined period of time.

19. The method of claim 14, further comprising:

determining, by the one or more processors, whether the predicted path of the ball is towards a field of play; and activating, by the one or more processors, the at least one of the one or more uplights only when the predicted path of the ball has the motion characteristic greater than or equal to the threshold motion characteristic and is towards the field of play.

20. The method of claim 14, wherein the one or more sensors comprise one or more directional microphones.

21. The method of claim 20, controlling the one or more directional microphones to capture the data descriptive of the ball moving above the common focal area comprises:

controlling, by the one or more processors, the one or more directional microphones, each directed towards a portion of the common focal area, to capture a respective audio stream;

analyzing, by the one or more processors, the one or more audio streams to detect an audio pattern classified as a hit audio pattern; and in response to detecting the audio pattern classified as the hit pattern, analyzing, by the one or more processors, audio data in the audio pattern.

22. The method of claim 21, wherein the hit audio pattern is defined by one or more of a decibel level of the audio data, a frequency of the audio data, an amplitude of the audio data, a spectrogram of the audio data, and a gradient of the audio data.

23. The method of claim 21, analyzing the audio data in the audio pattern comprises:

determining, by the one or more processors, the motion characteristic of the ball based on the audio pattern.

24. The method of claim 14, wherein the threshold motion characteristic comprises a motion characteristic where the ball would reach a height of the one or more uplights in one of the one or more lighting structures.

25. The method of claim 14, wherein each of the one or more lighting structures further comprise one or more downlights, wherein each of the one or more downlights are configured to initially be in an activated state, and wherein each of the one or more uplights are configured to initially be in a deactivated state.

26. The method of claim 14, wherein the common focal area comprises an area that includes a batter's area of a sports field.

27. A non-transitory computer-readable storage medium having stored thereon instructions that, when executed, cause one or more processors of a computing device to:

control one or more sensors to capture data descriptive of a ball moving above a common focal area, wherein each of the one or more sensors are directed at the common focal area, wherein the one or more sensors comprise one or more cameras;

based on the data, predict a motion characteristic of the ball;

compare the motion characteristic to a threshold motion characteristic;

in response to the motion characteristic being greater than or equal to the threshold motion characteristic, activate at least one of the one or more uplights in the at least one of the one or more lighting structures, wherein instructions that cause the one or more processors to control the one or more cameras to capture the data descriptive of the ball moving above the common focal area comprise instructions that, when executed, cause the one or more processors to:

control the one or more cameras, each directed towards a respective portion of the common focal area, to capture a respective video stream;

identify the ball within one or more of the video streams;

identify that the ball passed above a preliminary height in the one or more of the video streams at a first time;

based on a respective position of the ball in one or more frames timestamped near the first time of the one or more video streams, determine one or more of a velocity of the ball, a trajectory of the ball, and a rate of ascension of the ball; and based on the one or more of the velocity, the trajectory, and the rate of ascension, determine a predicted path of the ball.

* * * * *